Figure 1:
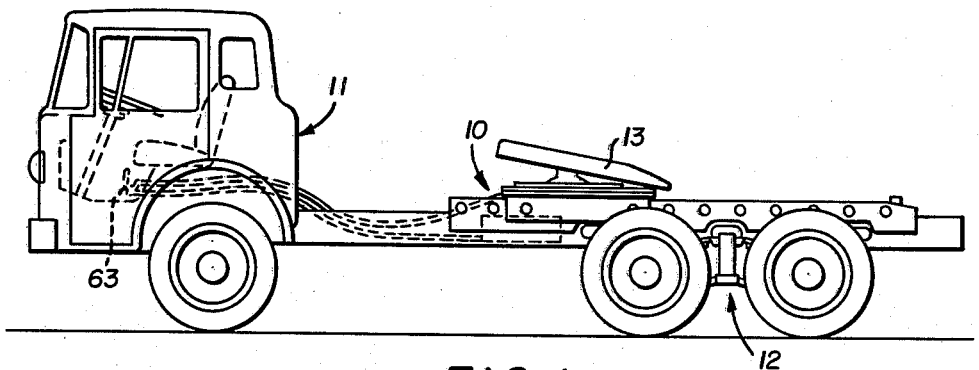

Feb. 23, 1965    G. N. WALTHER ETAL    3,170,716
ADJUSTABLE FIFTH WHEEL MOUNTING
Filed Feb. 4, 1963    2 Sheets-Sheet 1

INVENTORS
GEORGE N. WALTHER,
FREDERICK S. WALTHER &
BY FOREST L. WAITE
Hamilton & Cook
ATTORNEYS Feb. 23, 1965   G. N. WALTHER ETAL   3,170,716
ADJUSTABLE FIFTH WHEEL MOUNTING
Filed Feb. 4, 1963   2 Sheets-Sheet 2

INVENTORS
GEORGE N. WALTHER,
FREDERICK S. WALTHER &
BY FOREST L. WAITE
Hamilton & Cook
ATTORNEYS 3,170,716
ADJUSTABLE FIFTH WHEEL MOUNTING
George N. Walther, Frederick S. Walther, and Forest L. Waite, Dayton, Ohio, assignors to The Dayton Steel Foundry Company, Dayton, Ohio, a corporation of Ohio
Filed Feb. 4, 1963, Ser. No. 256,053
4 Claims. (Cl. 280—407)

The present invention relates to adjustable frame mounts. More particularly, the invention relates to the mounting of various components used on vehicles permitting readily adjustable positioning thereof, longitudinally with respect to the frame of the vehicle. Specifically, the invention relates to improvements in adjustable fifth wheel mountings for connection of a semi-trailer to a truck or tractor.

Adjustable mounts are used for connecting a component, such as a fifth wheel or a road gear suspension system, to the frame of a vehicle. In the past, many forms of adjustable mountings have been used. Their purpose has been to provide for shifting and adjustment of the load carried between the wheels of the trailer and the wheels of the tractor. Actually, this is a relatively simple operation in theory and requires merely that the point of contact between the tractor and trailer, or between trailer wheels and trailer frame, or both, be adjustable. When such an adjustment is provided, the load of the trailer in relation to the truck may be shifted as desired.

The prior art knows of many adjustable mountings, particularly adjustable mountings for fifth wheels. These prior art mountings are manually adjustable, requiring insertion of a resilient locking means to engage a longitudinally adjustable movable support to a fixed frame member. Such mountings have the disadvantage of manual operation and while satisfactory for fifth wheel mountings are not suited for mounting of the trailer running gear suspension and adjustment of the trailer wheels.

An undesirable characteristic of the prior art adjustable mountings is that the frame of the vehicles on which the mounting is used while strong enough to carry the loads is not completely rigid. The frame will and does flex slightly as the vehicle moves and will even be somewhat flexed when the vehicle is at rest if the wheels are not on an absolutly flat plane, particularly if the trailer is loaded. Such flexure of the frame binds the locking means so that they can be extracted only with difficulty, and if forcibly driven from locking engagement, they can not be reinserted because the flexure of the frame will prevent exact registration between the holes of the mounting. If the holes are made larger than the pins to facilitate insertion and extraction of the pin therefrom, there is undesirable play between the mount and the frame.

Therefore, it is an object of the present invention to provide a mounting for components used on vehicles permitting readily adjustable positioning longitudinally thereof with respect to the vehicle frame.

Further, it is an object to provide an adjustable mount suitable for use as either the mounting for a fifth wheel or the mounting for a road gear suspension system.

Still further, it is an object to provide an adjustable frame mount having a locking mechanism which will not bind because of flexure incident to the frame of the vehicle on which the mount is carried.

These and other objects of the invention, as well as the advantages thereof, will be apparent in view of the following detailed description and the drawings; it being understood that a preferred embodiment of the invention is shown by way of example in the accompanying drawings and described in detail without attempting to show all of the various modifications in which the invention might be embodied; the invention being measured by the appended claims and not by the details of the specification.

Figure 4:
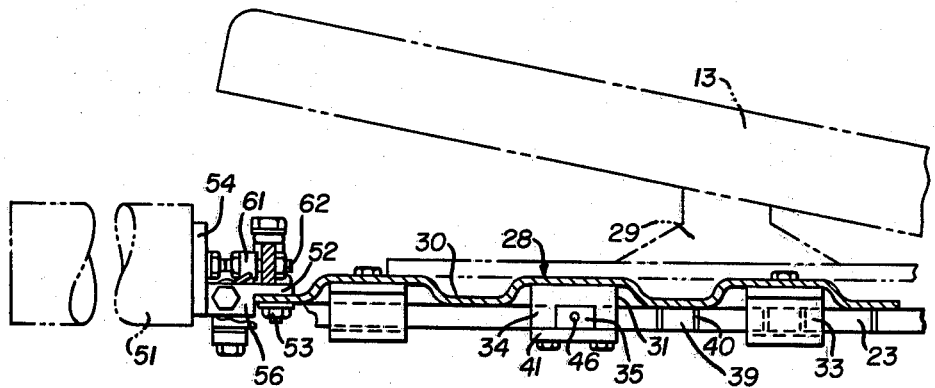
Figure 5:
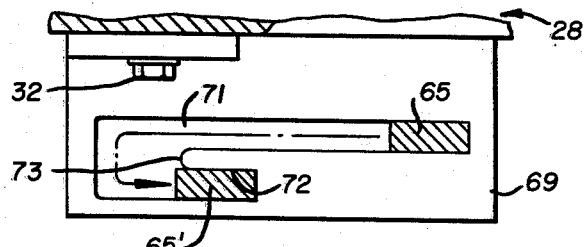
Figure 2:
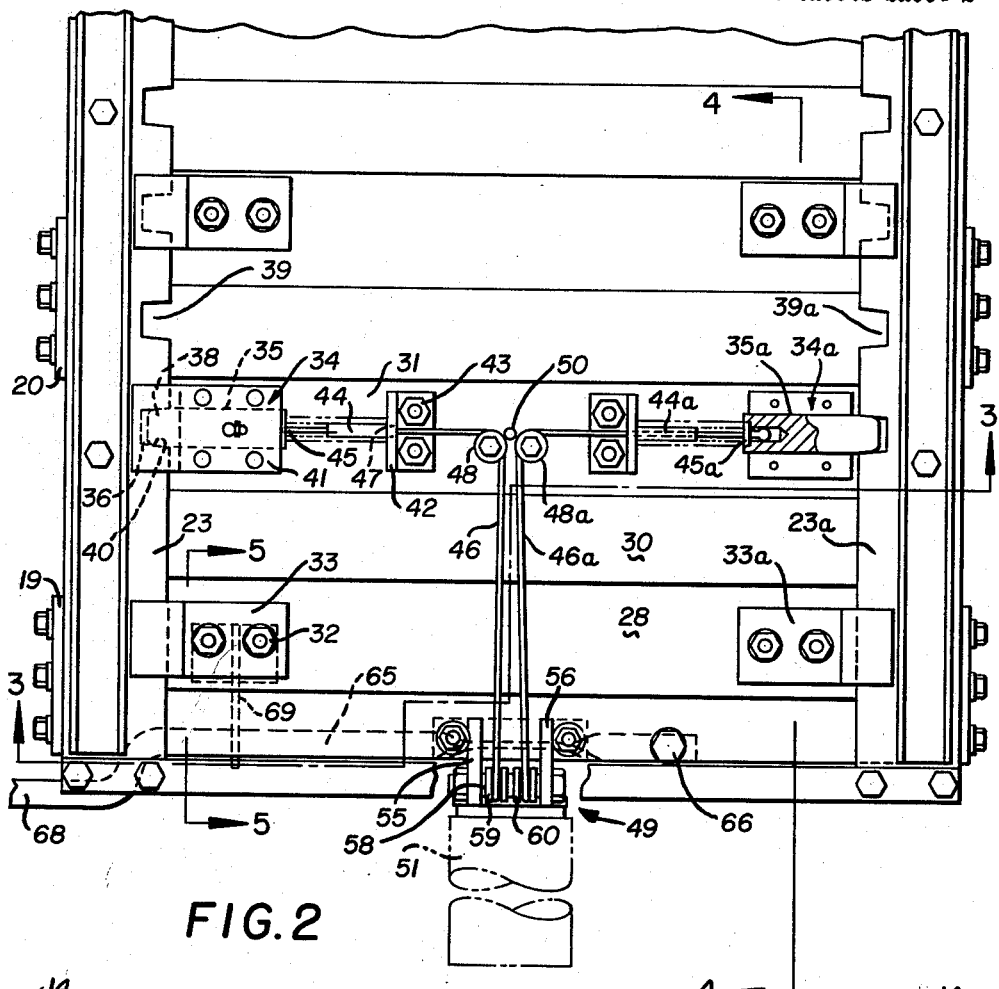
Figure 3:
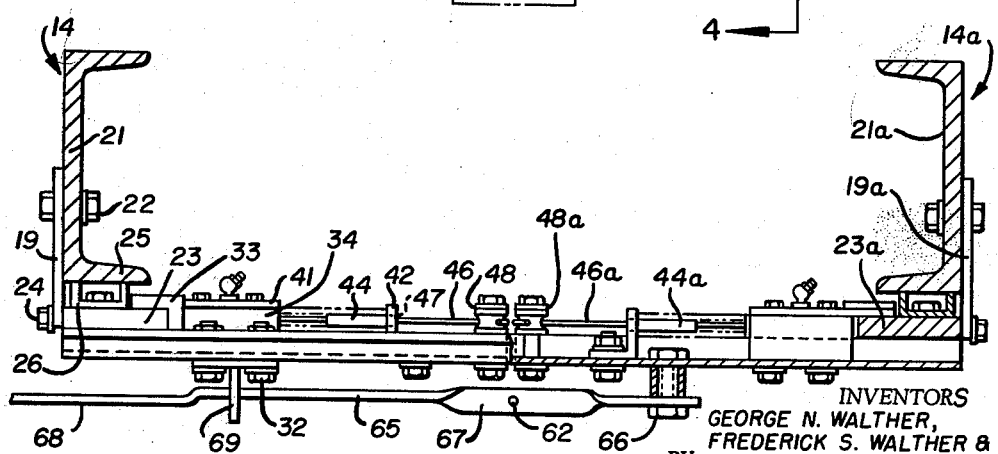

In the drawings:
FIG. 1 is a side elevation of a tractor carrying an adjustable frame mount according to the present invention;
FIG. 2 is a bottom plan view of an adjustable frame mount and locking mechanism according to the present invention;
FIG. 3 is a view partly in end elevation and partly in section taken substantially on line 3—3 of FIG. 2;
FIG. 4 is a longitudinal cross section of the adjustable frame mount shown in FIG. 1; and,
FIG. 5 is a cross section taken substantially on line 5—5 of FIG. 2 showing the guide and retaining bracket in elevation.

In general, an adjustable frame mount with locking mechanism is indicated generally by the numeral 10. The vehicle component, such as a fifth wheel or road gear suspension unit, is secured to the mount and slidable longitudinally therewith when the locking mechanism is open. When closed, the locking mechanism secures the mount at selected positions along the longitudinal side members of the frame. This locking mechanism preferably utilizes a pair of interfitting members between the mount and each of the longitudinal side members of the frame. One of the interfitting members is a bolt and the other is a receiver into which the bolt seats. The end of the bolt which seats in the receiver is tapered at such an angular degree as to prevent any binding between the bolt and the receiver. The bolt is adapted to be withdrawn from and inserted into the receiver at will in order to adjustably position the mount at the desired location along the longitudinal side members of the frame.

Referring to the drawings, the frame mount 10 is carried on a tractor 11. Although the assembly 10 may be utilized with equal facility to carry the tandem suspension system 12, it is described in conjunction with the environment of carrying a fifth wheel 13.

As can best be seen in FIGS. 2 and 3, the assembly comprises symmetrical halves so only one side will be described with the corresponding numbers on the other side being designated by the same numeral together with the letter "a."

The frame of the tractor 11 has two longitudinal side members 14 and 14a to which the assembly 10 is secured. As is customarily the situation these longitudinal side members are opposed channels with inwardly directed flanges, or legs.

Side plates 19 and 20 are attached to the web 21 of channel 14, as by bolts 22. A rail 23 parallels the longitudinal frame member and is connected to the side plates 19 and 20, as by the cap screws 24. In order to assure adequate clearance between the movable portion of the assembly 10 and the lateral members of the frame, indicated generally by the letter "X," the rail 23 is spaced above the upper flange 25 of the longitudinal side member 14. A riser 26, shown in the shape of a channel, is interposed between the rail 23 and the upper flange 25 of the longitudinal side member 14. This riser imparts stability to the rail 23 and also assures the adequate clearance required between the frame member "X" and the movable portion of assembly 10.

The mounting plate, indicated generally by the numeral 28, slides along the rails 23 and 23a and carries trunnion base 29 on which the fifth wheel 13 is pivotally mounted. As best shown in FIG. 4 the plate 28 is formed of a series of wide corrugations aligned transversely to a longitudinal axis of the side frame members 14 and 14a in order to increase the rigidity of plates 28 between these supports with the least weight. In the embodiment shown the plate 28 has three convolutions with the valleys 30 slidably engaging the rail 23 and the crests 31 spaced apart therefrom.

Attached, as by bolts 32, to the outer two crests 31, are rail keepers 33. The keepers 33 are Z-shaped in side elevation (see FIG. 3) and engage the under side of rail 23 in opposition to and between the valleys 30.

A lock guide 34 is secured to the middle crest 31. Axially slidable in lock guide 34 and in the same plane as rail 23 is a lock bolt 35. Each of the sides 36 of the outer end 38 of bolt 35 are tapered convergently outwardly at an angle of approximately 7°. A series of notch-like receivers 39 are provided along the rail 23 and are adapted to be matingly engaged by the outer end 38 of bolt 35. By similarly tapering the sides 40 of the receivers 39 at 7° the most advantageous locking engagement is effected between the lock bolt 35 and receiver 39.

The tapered sides of both bolt and receiver assure that the bolt 35 will seat into the receiver 39 without any play. Furthermore, the particular taper also assures that the bolts can be inserted into and extracted from the receiver with ease even though flexure of the frame would bind a straight sided bolt. The ease of the locking and unlocking operation is further facilitated by the use of only one bolt and receiver on each side of plate 28 and placing those in the medial portion of the longitudinal dimension of the plate 28.

A cover plate 41 is attached to the under side of the lock guide 34 which also preferably extends beneath and slidingly engages the under side of rail 23 to provide an additional keeper means similar to keepers 33.

Spaced axially inwardly of bolt 35 is a spring stop 42 which is depicted as being an angle secured to the middle crest 31 as by bolts 43. The compression spring 44 extends between the spring stop 42 and the rear of bolt 35. The spring 44 constantly biases the bolt outwardly of lock guide 34 toward engagement position of the bolt 35 with receiver 39.

Also attached to the rear of bolt 35 is a cable fitting 45. A flexible cable 46 is anchored to the fitting 45 and extends longitudinally through compression spring 44, through bore 47 in spring stop 42, around pulley 48 and back to the operating means, indicated generally by the numeral 49.

As best shown in FIG. 2, a retaining pin 50 is placed between pulleys 48 and 48a to prevent the cables 46 and 46a from becoming disengaged from their respective pulleys 48 and 48a if any slack occurs in the cables.

The operating means 49 may be either a manual or fluid operated arrangement, or both.

The fluid operated arrangement comprises a cylinder 51 carried on mounting plate 28, as by bracket 52 mounted thereto by bolt 53. A mounting shoe portion 54 of bracket 52 is connected to the cylinder 51 by two spaced-apart legs 55 and 56. A shaft 58 extends between legs 55 and 56 and carries two pulleys 59 and 60 rotatably journaled thereon. The cables 46 and 46a are reeved around the pulleys 59 and 60, respectively, and fastened to a connector 61 adjustably positionable along the piston shaft 62 to regulate the amount of slack in the cables 46 and 46a.

The fluid most generally available on vehicles of the type disclosed is air, so the cylinder 51 may be pneumatically operated by a control 63 (FIG. 1) placed conveniently for the driver, as in the cab.

A manual operator may also be utilized. The manual operator disclosed comprises a lever 65 pivoted at one side of the mounting plate 28, as by bolt 66. The lever 65 extends transversely between the side frame members 14 and 14a, having a handle portion 68 on the side opposite from the pivot. The end of the piston shaft 62 engages the lever 65 in the medial vertically oriented portion 67 and is reciprocatingly operatable by swinging the lever horizontally about its pivot 66.

Between the handles 68 and the connection of the shaft 62 to the lever 65 is a guide and retaining bracket 69, carried on the upper side of the mounting plate 28, as by bolts 32.

As best seen in FIG. 5, the guide and retaining bracket 69 is a horizontal slot 71 in which the lever 65 can be swung. At one end of the slot 71 is an offset 73 into which the lever can be lifted at one end of its swing. A protruding shoulder 73 between the slot 71 and the offset 72 prevents the lever 65 from inadvertently entering or leaving offset 72.

To adjustably position the mounting plates 28, the plate must be unlocked from the frame. Either the control 63 is operated to actuate the cylinder 51 or the handle 68 on lever 65 is grasped to swing the lever so that the piston shaft 62 is extended outwardly from cylinder 51. If the manual operation is being used, the lever 65 may be moved into offset 72 (i.e., to position 65′ in FIG. 5) where it is retained by shoulders 73.

In either event, the extension of shaft 62 applies tension to cables 46 and 46a which slide the bolts 35 and 35a out of engagement with the mating receivers 39 and 39a, respectively. When the bolts are disengaged from the receiver, the mounting plate 28 is completely unlocked and may be shifted longitudinally along rails 23 and 23a to the desired location. If no load is being carried on the fifth wheel 13, the mount can be manually positioned. If a trailer is attached thereto, the tractor is simply driven in a direction opposite to the direction it is desired to have the plates 28 moved. When the plate 28 is positioned in its desired location either the manual lever 68 is reversely pivoted or the pneumatic operating means 49 is actuated to release the tension on cables 46 and 46a. In response to this release of the tension on cables 46 and 46a the compression springs 44 and 44a slide the respective bolts 35 and 35a axially outwardly in lock guides 34 and 34a into locking engagement with the receivers 39 and 39a.

Accordingly, an adjustable frame mount with locking mechanism embodying the concepts of the present invention provides a rugged construction which will not bind under adverse operating conditions.

What is claimed is:

1. An adjustable frame mount with locking mechanism adapted to be mounted on the frame of a vehicle, said vehicle frame having at least two longitudinal side members, said frame mount with locking mechanism comprising, a rail means attached to said side members, a mounting plate slidable longitudinally of said side members along said rail means, a pair of lock bolts attached to the medial portion of said mounting plates, said bolts oriented transversely of said side members, a series of notch-like receivers on said rail means, one end of each said bolt being tapered at about 7° to the axes of said bolt for selective mating engagement with a receiver to lock said mounting plate at selected positions along said rail means, a spring means operatively connected to bias said bolts into engagement with said receivers, a cable means attached to said bolts, and operating means to connect said cable means to slide said bolts out of engagement with said receivers.

2. An adjustable frame mount with locking mechanism adapted to be mounted on the frame of a vehicle, said vehicle frame having at least two longitudinal side members, said frame mount with locking mechanism comprising, a rail attached to each side member, a mounting plate, said mounting plate slidable on the upper surface of said rail and corrugated transversely thereto, keeper means on said mounting plate engaging the under surfaces of said rails to prevent said mounting plate from lifting off said rails, a lock guide on each side of said mounting plate in the medial portion thereof, a lock bolt axially slidable in each said lock guide, said bolts being oriented transversely of said rails, a plurality of notch-like receivers in the opposed and facing portions of said rails, one end of each said bolt tapered to matingly engage a receiver for locking said mounting plate at selected positions along said rails, and means selectively to move the tapered end of said bolts into and out of engagement with said receivers.

3. An adjustable frame mount with locking mechanism adapted to be mounted on the frame of a vehicle, said vehicle frame having at least two longitudinal side members, said frame mount with locking mechanism comprising, a rail attached to each side member, a mounting plate, said mounting plate slidable on the upper surface of said rail and corrugated transversely thereto, keeper means on said mounting plate engaging the under surfaces of said rails to prevent said mounting plate from lifting off said rails, a lock guide on each side of said mounting plate in the medial portion thereof, a bolt axially slidable in each said lock guide, said bolts being oriented transversely of said rails, a plurality of notch-like receivers in the opposed and facing portions of said rails, one end of each said bolt tapered to matingly engage said receivers for locking said mounting plates at selected positions along said rails, a spring means operatively connected to bias said bolts into engagement with said receivers, a cable means attached to each of said bolts, and operating means connected to said cable means to slide said bolts out of engagement with said receivers.

4. An adjustable frame mount with locking mechanism adapted to be mounted on the frame of a vehicle, said vehicle frame having at least two longitudinal side members, said frame mount with locking mechanism comprising, a rail attached to each side member, a mounting plate slidably engaging the upper surface of said rail and corrugated transversely thereto, spaced rail keepers attached to said mounting plate and engaging the under surfaces of said rails, a lock guide on each side of said mounting plate in the medial portion thereof, a bolt axially slidable in each said lock guide and oriented transversely of said rails, a plurality of notch-like receivers in the opposed and facing portions of said rails, the mating end of each said bolt and said receivers tapered at about 7° to provide locking engagement of said mounting plates at selected positions along said rails, a spring attached to each said bolt biasing each said bolt outwardly into engagement with said receivers, a cable having suitable guide means attached to each said bolt, and operating means connected to said cables selectively to disengage each said bolt from said receivers.

References Cited in the file of this patent
UNITED STATES PATENTS

| | | |
|---|---|---|
| 2,755,104 | Braunberger | July 17, 1956 |
| 2,799,516 | Greenway | July 16, 1957 |
| 2,835,504 | Acker | May 20, 1958 |
| 2,860,891 | Ramun | Nov. 18, 1958 |
| 2,889,154 | De Lay | June 2, 1959 |
| 2,900,194 | De Lay | Aug. 18, 1959 |
| 2,985,463 | Geerds | May 23, 1961 |
| 3,030,125 | Braunberger | Apr. 17, 1962 |
| 3,102,738 | De Roshia | Sept. 3, 1963 |

FOREIGN PATENTS

| | | |
|---|---|---|
| 584,416 | Great Britain | Jan. 14, 1947 |